(12) United States Patent
Line et al.

(10) Patent No.: US 9,199,560 B2
(45) Date of Patent: Dec. 1, 2015

(54) SELF-ADJUSTING SEAT STIFFNESS SYSTEM

(71) Applicant: FORD GLOBAL TECHNOLOGIES, LLC, Dearborn, MI (US)

(72) Inventors: Johnathan Andrew Line, Northville, MI (US); Richard Edward Ruthinowski, Taylor, MI (US); Edward Joseph DeSmet, Canton, MI (US); Brian Robert Spahn, Plymouth, MI (US); William Jerome Olsen, Farmington Hills, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 14/026,018

(22) Filed: Sep. 13, 2013

(65) Prior Publication Data

US 2015/0076879 A1    Mar. 19, 2015

(51) Int. Cl.
*B60N 2/427* (2006.01)
*A47C 7/32* (2006.01)
*A47C 7/22* (2006.01)

(52) U.S. Cl.
CPC .............. *B60N 2/42763* (2013.01); *A47C 7/22* (2013.01); *B60N 2/4279* (2013.01); *B60N 2/42781* (2013.01)

(58) Field of Classification Search
CPC .............. B60N 2/4263; B60N 2/42718; B60N 2/42763; B60N 2/4279; B60N 2/42781; B60R 21/18; B60R 21/207; B60R 2021/23169; B60R 2021/23176; A47C 7/22

USPC .............. 180/271, 274, 282; 280/806, 730.1, 280/733, 734, 748; 297/216.1, 284.2, 297/284.11
See application file for complete search history.

(56) References Cited

U.S. PATENT DOCUMENTS

| | | | |
|---|---|---|---|
| 4,155,592 A | 5/1979 | Tsuda et al. | |
| 4,334,709 A * | 6/1982 | Akiyama et al. | 297/284.11 |
| 4,623,192 A * | 11/1986 | Koide et al. | 297/284.11 |
| 4,629,248 A * | 12/1986 | Mawbey | 297/284.11 |
| 4,712,834 A | 12/1987 | Warrick | |
| 4,722,550 A * | 2/1988 | Imaoka et al. | 280/727 |
| 4,858,992 A | 8/1989 | LaSota | |
| 5,058,952 A | 10/1991 | LaSota | |
| 5,125,472 A * | 6/1992 | Hara | 180/271 |

(Continued)

FOREIGN PATENT DOCUMENTS

| | | | | |
|---|---|---|---|---|
| DE | 3631881 A1 * | 4/1988 | | B60R 21/02 |
| DE | 19927886 A1 | 1/2001 | | |

(Continued)

*Primary Examiner* — Laura Freedman
(74) *Attorney, Agent, or Firm* — Frank A. MacKenzie; Brooks Kushman P.C.

(57) ABSTRACT

A self-adjusting seat stiffness system that uses a tension member and tensioning device to maintain or increase tension in a seat component during a perceived vehicle dynamic event. The system may use an inertial latching spool for the tensioning device as an example of a way to maintain tension at a target acceleration of the spool by locking up the tension member, or may have a controller to control the tensioning member to provide variable tensions depending on varying perceived vehicle parameters. The tensioning of the tension member helps to avoid submarining of an occupant under a seatbelt due to unacceptable seat compression during a vehicle dynamic event.

20 Claims, 3 Drawing Sheets

(56) References Cited

U.S. PATENT DOCUMENTS

| | | | |
|---|---|---|---|
| 5,492,368 A * | 2/1996 | Pywell et al. | 280/806 |
| 5,769,489 A * | 6/1998 | Dellanno | 297/216.14 |
| 5,908,219 A * | 6/1999 | Bohmler | 297/216.1 |
| 5,975,633 A * | 11/1999 | Walk et al. | 297/284.9 |
| 6,042,041 A * | 3/2000 | Foster et al. | 242/374 |
| 6,050,635 A * | 4/2000 | Pajon et al. | 297/216.1 |
| 6,086,097 A * | 7/2000 | Van Wynsberghe | 280/748 |
| 6,113,185 A * | 9/2000 | Yamaguchi et al. | 297/216.1 |
| 6,116,694 A * | 9/2000 | Bullard | 297/452.52 |
| 6,203,105 B1 * | 3/2001 | Rhodes, Jr. | 297/284.6 |
| 6,349,991 B1 | 2/2002 | Jaekel | |
| 6,520,577 B2 * | 2/2003 | Kitagawa | 297/216.13 |
| 6,616,229 B2 | 9/2003 | Kuester et al. | |
| 6,648,409 B1 * | 11/2003 | Laporte | 297/216.1 |
| 6,715,788 B2 * | 4/2004 | Saiguchi et al. | 280/730.1 |
| 6,746,077 B2 * | 6/2004 | Klukowski | 297/216.1 |
| 6,752,454 B2 * | 6/2004 | Ruel et al. | 297/216.1 |
| 6,793,289 B2 | 9/2004 | Kuster et al. | |
| 6,848,717 B2 * | 2/2005 | Bullinger et al. | 280/806 |
| 6,863,298 B2 * | 3/2005 | Sakai et al. | 280/728.1 |
| 6,935,684 B2 * | 8/2005 | Sakai | 297/216.1 |
| 6,994,399 B2 | 2/2006 | Van-Thournout et al. | |
| 7,059,445 B2 * | 6/2006 | Higuchi et al. | 180/268 |
| 7,131,695 B2 * | 11/2006 | Hofschulte et al. | 297/284.9 |
| 7,150,500 B2 * | 12/2006 | Hippel et al. | 297/216.1 |
| 7,341,216 B2 * | 3/2008 | Heckmayr | 242/374 |
| 7,396,077 B2 | 7/2008 | Boulva | |
| 7,469,766 B2 * | 12/2008 | Guo et al. | 180/268 |
| 7,527,333 B2 * | 5/2009 | Suzuki et al. | 297/216.1 |
| 7,607,728 B2 * | 10/2009 | Hiruta et al. | 297/216.1 |
| 7,784,866 B2 * | 8/2010 | Yoshikawa et al. | 297/216.1 |
| 7,845,721 B2 * | 12/2010 | Maeda et al. | 297/216.12 |
| 7,850,205 B2 | 12/2010 | Pisaniello et al. | |
| 8,047,606 B2 * | 11/2011 | Matsui | 297/216.12 |
| 8,100,471 B2 * | 1/2012 | Lawall et al. | 297/216.1 |
| 8,172,267 B2 * | 5/2012 | Eberle et al. | 280/806 |
| 8,196,960 B2 * | 6/2012 | Gandhi | 280/801.1 |
| 8,449,038 B2 * | 5/2013 | Flanigan | 297/468 |
| 8,632,126 B2 * | 1/2014 | Nitsuma | 297/216.13 |
| 8,702,120 B2 * | 4/2014 | Kalisz et al. | 280/730.1 |
| 8,746,792 B2 * | 6/2014 | Ruthinowski et al. | 297/216.1 |
| 9,016,783 B2 * | 4/2015 | Line et al. | 297/284.11 |
| 9,016,784 B2 * | 4/2015 | Line et al. | 297/284.11 |
| 2006/0119149 A1 * | 6/2006 | Yoshikawa et al. | 297/216.1 |
| 2007/0235999 A1 * | 10/2007 | Morra et al. | 280/806 |
| 2011/0187177 A1 * | 8/2011 | Flanigan | 297/468 |
| 2011/0272978 A1 | 11/2011 | Nitsuma | |
| 2013/0285426 A1 * | 10/2013 | Arant et al. | 297/284.1 |

FOREIGN PATENT DOCUMENTS

| | | | | |
|---|---|---|---|---|
| DE | 10242236 A1 | | 4/2004 | |
| JP | 05077686 A | * | 3/1993 | B60R 22/46 |

* cited by examiner

SELF-ADJUSTING SEAT STIFFNESS SYSTEM

TECHNICAL FIELD

This disclosure relates to vehicle seats, and more specifically to a vehicle seat with self-adjusting seat stiffness system.

BACKGROUND

Vehicles typically have at least one seat for an occupant to sit in while the vehicle is in use. Vehicle seats may include a base adjustably mounted to a floor of the vehicle and a backrest adjustably mounted to the base, although other seat designs have been used, such as a continuous seating base and backrest design, or multiple seating bases with multiple backrest designs, or the base or backrest of the seat may be provided by a vehicle structure, or any combination of the above. The base and backrest, whether they are separate components or a continuous unit, typically have a structural perimeter frame with a suspension system disposed therein. The suspension system is used to support an occupant and to provide comfort while they are seated. Suspension systems typically consist of a combination of box, coil springs, or a wire-like mesh suspension system and foam. The suspension systems typically span between at least one pair of opposing structural members of the perimeter frame to facilitate meeting occupant position and comfort requirements.

The base and backrest function to provide a reaction surface for occupant mass and provide occupant support. Base and backrest suspension system stiffness is a fixed value and is dependent upon the spring/foam stiffness combination of the suspension system. Some systems may offer a way for the occupant to vary the stiffness of the seat for comfort, but once the stiffness level is chosen, the stiffness remains a fixed value during use.

Seatbelts are often used to hold an occupant to the sear. During vehicle acceleration, the mass and acceleration of the occupant in the seat may cause the seat and/or backrest to compress such that space between the seatbelt and the seat becomes greater, which may in turn allow the occupant to slide out from under the seatbelt. The term acceleration, as used here, also includes deceleration. The sliding out from under a seatbelt caused by seat compression may be referred to as submarining. Five and six point harness seatbelts help prevent submarining by using crotch straps, but most vehicles are not equipped with five and six point harness systems, as they are perceived as being uncomfortable and inconvenient for everyday use.

A seat may be provided with a pronounced geometry in specific locations or a stiffer base and backrest to increase occupant support and seatbelt restraint during acceleration. However, greater pronounced geometries and stiffness tend to decrease seat comfort, as softer seats tend to increase comfort.

SUMMARY

One aspect of this disclosure is directed to a self-adjusting seat stiffness system having a tension member in cooperation with a tensioning unit connected to and spanning a portion of a seat. The tensioning unit is configured to automatically adjust the tension of the tension member providing seat stiffness in response to a perceived vehicle dynamic event. The tensioning unit may be an inertial-latching retracting spool, an electric retractor, a pyro-technic retractor, or any number of other devices that are capable of providing stiffness to the tension member.

A controller may be employed to control the tensioning unit. The controller may send a signal to the tensioning unit to maintain tension in the tension member or to increase tension in the tension member. The controller may be in communication with a vehicle pre-crash system, and the controller may set the tension of the tension member in response to a potential collision of the vehicle with another object as indicated by the pre-crash system. The controller may be in communication with a seat pressure sensor, or weight sensor, and the controller may set the tension of the tension member in response to an increase in seat pressure, or weight, especially in the case of a rapid increase in seat pressure, or weight. The controller may also be capable of monitoring vehicle acceleration. The controller may monitor vehicle acceleration by communicating with a vehicle communication system. The perceived vehicle dynamic event may be a trigger acceleration value, and the controller may set the tension of the tension member in response to a trigger acceleration value.

The seat may have opposing first and second frame members and the tension member may span the seat between the first and second frame members. The tension member may be connected to the first frame member and the tensioning unit may be connected to the second frame member. The tension member may be aligned transversely with respect to the vehicle, it may run longitudinally with respect to the vehicle, or any appropriate direction in-between. The seat may have a seat suspension system comprised of springs and pads and the tension member may be disposed within the suspension system or across the top of the suspension system.

The system may also have an inflatable member connected to the tension member. The inflatable member may be deployable in response to a perceived vehicle dynamic event in combination with the tensioning member maintaining or increasing tension.

According to another aspect of this disclosure, a vehicle seat anti-submarining system is disclosed. The anti-submarining system has a tension member spanning a portion of a vehicle seat between opposing frame members, and a controller for tensioning the tension member to provide enhanced stiffness to the portion of the seat in response to a perceived vehicle dynamic event.

With this system, the perceived vehicle dynamic event may be an acceleration of the vehicle above a target acceleration or a potential collision of the vehicle with another object. A tensioning unit may be an inertial-latching retracting spool, an electric retractor, or a pyro-technic retractor. An inflatable member may be connected to the tension member, and the inflatable member may also be deployable in response to the tensioning of the tension member.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
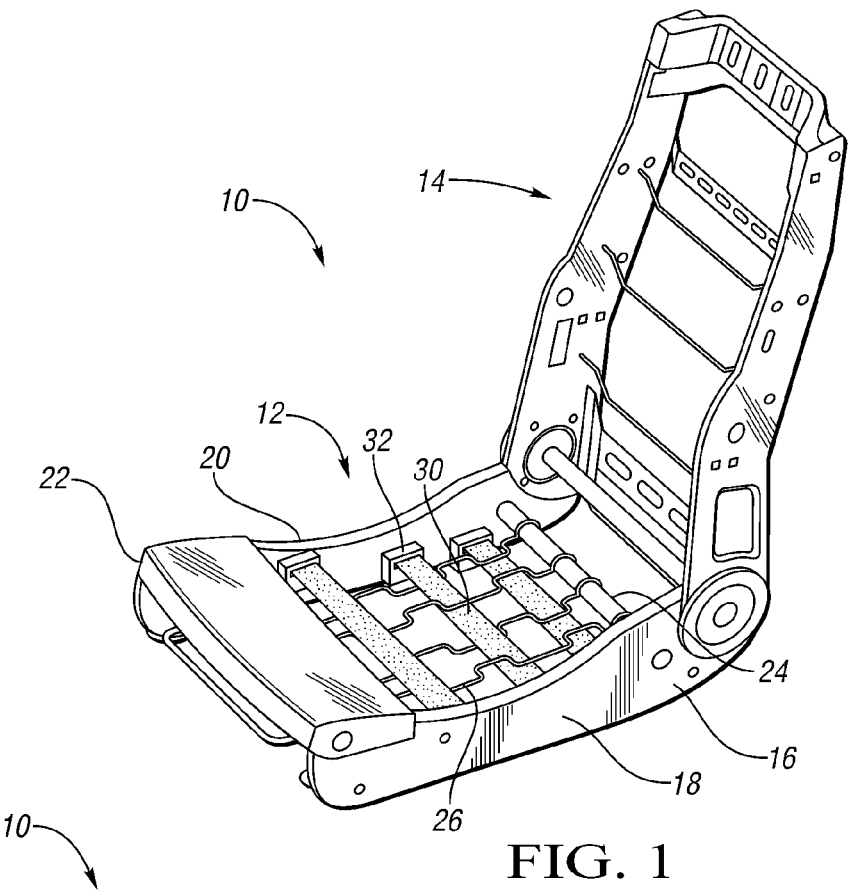
FIG. 1 is a perspective view of a seat frame having tension members extending in a substantially transverse vehicle direction when the seat is installed in the vehicle.

FIG. 1 shows a vehicle seat 10 without padding or upholstery. Seat 10, when padded and upholstered, has a base 12 and a back 14 capable of providing support for an occupant (not shown) when riding in a vehicle. The seat 10 also has a frame 16 which provides structural support for the components of the seat 10. The frame 16 may have side frame members 18, 20, a front frame member 22, and a rear frame member 24 which cooperate to frame the base 12. The side frame members 18, 20 may provide opposing first and second frame members 18, 20. The front and rear frame members 22, 24 may also provide opposing first and second frame members 22, 24.

The seat 10 is shown with a spring-style seat suspension system 26, although other suspension systems may be used. A cushion or foam pad may be added to the top, or integrated with, the seat suspension system 26 before the seat 10 is upholstered. The seat suspension system 26 is designed to provide a comfortable feel for an occupant in the seat.

A tension member 30 is shown spanning the seat 10 between first and second frame members 18, 20. The tension member 30 may be connected to the first frame member 18. The tension member 30 may be aligned to extend substantially transversely with respect to a vehicle when the seat 10 is installed in the vehicle. The term substantially transversely, as used here, means that the tension members 30 do not have to extend at perfect 90 degree angles to the longitudinal axis of the vehicle, rather that the tension members 30 may have more of a cross-car extension than a fore/aft extension.

The middle tension member 30 is shown interwoven with the seat suspension system 26, however tension members 30 may be disposed over, as shown with the forward tension member 30, or under the seat suspension system 26, as shown with the rearward tension member 30, or even be used to replace the seat suspension system 26 altogether. The tension member 30 may be made up of a material similar to that of seatbelt webbing, although it is not limited to this material or shape.

A tensioning unit 32 may be connected to the second frame member 20 and in cooperation with the tension member 30 span a portion of the seat 10. The tensioning unit 32 is capable of cooperating with the tension member 30 to automatically adjust the tension of the tension member 30 providing seat stiffness in response to a perceived vehicle dynamic event. The tensioning unit 32 may be a thin-package retracting spool assembly with inertial latching tuned to specific vehicle pulse targets to trigger the tension member 30 at the correct vehicle inputs. The tensioning unit 32 may also be an inertial latching with a solenoid, a motorized winding, a pyro-technic system, or any number of devices which may be used to maintain the tension member 30 in an initial stiffness, or even increase the stiffness, at the time of deployment.

The retracting spool assembly may allow for the tension of the tension member 30 to ebb and flow during vehicle use outside of the perceived vehicle dynamic event and maintain the initial tension or increase the tension of the tension member 30 during the perceived vehicle dynamic event. The retracting spool may have a spring (not shown) which may allow for a lower set tension level of the tension member 30 during normal vehicle use, and then the tensioning unit 32 may stop further extension of the tension member 30, or may retract the tension member 30 into the spool, during the perceived vehicle dynamic event to maintain or increase the tension level. The retracting spool may have an inertia latching that may lock the spool if the acceleration and/or velocity of the spool is higher than a set amount. In other words, if the tension member 30 is pulled too quickly from the tensioning unit 32, the inertial latch will lock and prevent the tension member 30 from moving with the seat suspension system 26.

When the vehicle is in normal use the occupant experiences a number of accelerations in the longitudinal, transverse and vertical vehicle directions while in the vehicle seat 10, and the seat suspension system 26 provides absorption of the occupant's body accelerations. The seat suspension system 26 provides support and cushion for the occupant. The tension member 30 and tensioning unit 32 cooperate to allow the seat suspension system 26 to provide support to the occupant and compress and rebound under the occupant to provide for a cushioned ride without noticeable interference. The tension member 30 and tensioning unit 32 may even be configured to provide the seat suspension system 26, or a portion of the seat suspension system 26, during normal vehicle use.

A compression of the seat suspension system 26 resulting from the mass of the occupant against the seat 10 during vehicle acceleration may allow for an increased gap between the seat 10 and a seatbelt (not shown). As mentioned above, the term acceleration includes deceleration. An increased gap between the seat 10 and seatbelt may change the ability for the seatbelt to hold the occupant in the seat 10. A rapid acceleration may increase the gap between the seat 10 and the seatbelt even further.

When the tension member 30 and tensioning unit 32 experience a perceived vehicle dynamic event, such as a rapid acceleration of the vehicle, the tension member 30 and tensioning unit 32 cooperate to maintain a set tension such that the seat suspension system 26 does not experience further compression from the occupant against the seat 10. The tension member 30 and tensioning unit 32 cooperate to maintain, or increase, the tension of the seat 10 to maintain the gap between the seat 10 and the seatbelt substantially constant, or even close the gap, so that the occupant is better held in the seat 10 by the seatbelt. Maintaining the gap between the seat 10 and the seatbelt helps stop an occupant from 'submarining' out from under the seatbelt.

Tension members 30 may also be disposed in the seat 10 in such a way as to provide a ramp or upward step in a longitudinally forward direction. The more forward tensioning units 32 may be attached to the side frame members 18, 20 at vertical locations that are higher than more rearward tensioning units 32. This configuration provides for the tension members 30 to cross the seat and provide a ramp effect which may further inhibit a submarining event.

Figure 2:
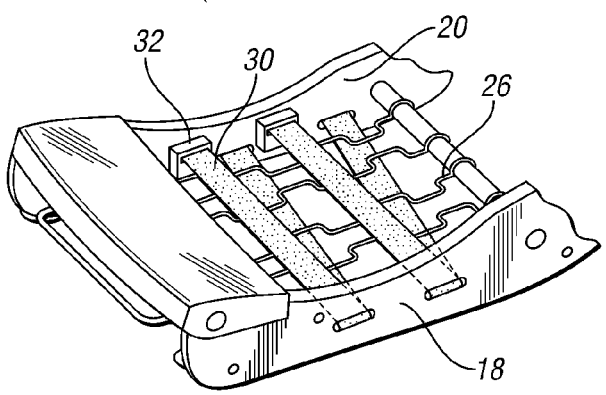
FIG. 2 is a perspective view of a seat frame having tension members extending and returning at an acute angle to a transverse vehicle direction.

FIG. 2 shows a tension member 30 extending between a first and second frame member 18, 20 in an angled criss-cross direction. The tension member 30 is shown extending at acute angles to the transverse vehicle direction. The tension member 30 is connected to the second frame member 20, extends angularly across the seat 10 to the first frame member 18, loops back upon itself and returns to a tensioning unit 32 connected to the second frame member 20. The tension member 30 may loop through a pin disposed in an opening defined by the first frame member 18, as shown, or the tension member 30 may loop through a bracket extending from the first frame member 18, or through the first frame member 18 itself. The tension member 30 may extend under the seat suspension system 26 in one direction and over the seat suspension system 26 in the other, over in both directions, under in both directions, or be interwoven with the seat suspension system 26 in one of the directions or both, or any combination of the above.

Figure 3:
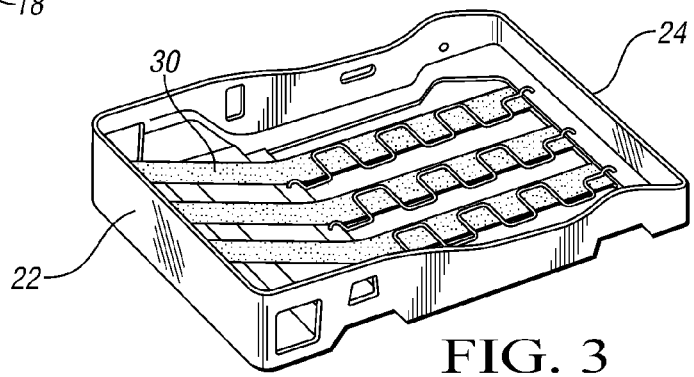
FIG. 3 is a perspective view of a seat frame having tension members extending in a substantially longitudinal vehicle direction.

FIG. 3 shows a tension member 30 extending between a first and second frame member 22, 24. In this embodiment the first and second frame members 22, 24 are the front and rear frame members 22, 24. The tensioning unit 32 may be attached to either the first or second frame member 22, 24 with the tension member 30 extending therefrom to another frame member. Although the above figures show tension members 30 only extending between first and second frame members 18, 20, or 22, 24, tension members 30 may extend between first and second members and third and fourth members simultaneously resulting in an overlap of tension members 30. Tension members 30 may also extend between two adjacent frame members and the tension member 30 may also be a mesh of belts or webbing extending between two or more frame members.

The tensioning units 32, although not specifically shown in this figure, may be attached to the front frame member 22 at a vertical location that is higher than the vertical location of the corresponding tensioning unit 32 for the same tension member 30 is attached to the rear frame member 24. This configuration allows the tension members 30 to provide a ramp effect when the tensioning units 32 activate to maintain or increase the stiffness of the tension members 30, which may further inhibit a submarining event.

Figure 4:
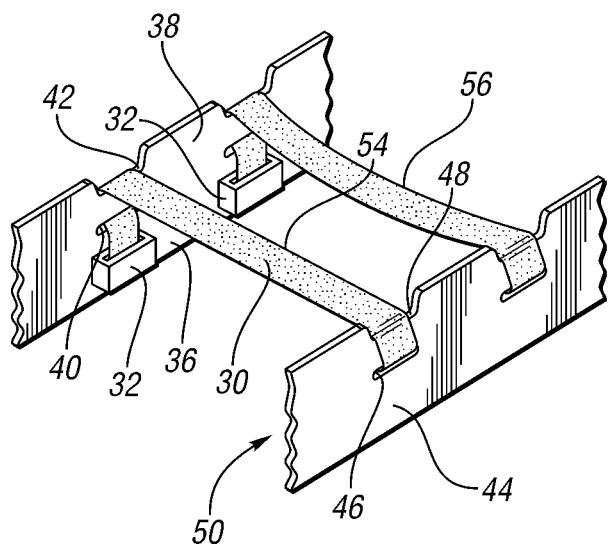
FIG. 4 is a partial view of a seat with tensioning unit disposed on the inside of opposing frame members and a tensioning member routed through a frame member.

FIG. 4 shows an embodiment in which the tensioning unit 32 is disposed on an inner surface 36 of a frame member 38. The frame member 38 may be a side frame member 18, 20, a front frame member 22, a rear member 24 of a base 12, as shown in FIG. 1, or it may be any other frame member in the frame 12 of the seat 10 including a frame member in the back 14. In this embodiment, the frame member 38 defines a passage hole 40 and a notch 42 to orientate the tension member 30 as it extends from the tensioning unit 32. An opposing frame member 44 from frame member 38 also defines a passage hole 46 and notch 48. The tension member 30 extends from the tensioning unit 32 through the passage hole 40 and up and around the notch 42 over to the notch 48 on the opposing frame member 44 and down through the passage hole 46 and is anchored on the inner surface 50 of the opposing frame member 44.

FIG. 4 shows two tension members 30; a first tension member 54 and a second tension member 56, although any number of tension members 30 may be used. The first tension member 54 is shown in an activated state where the tensioning unit 32 is maintaining or increasing the tension on the first tension member 54, and the second tension member 56 is shown in a relaxed state where a tensioning unit 32 is not maintaining or increasing tension on the second tension member 56.

Figure 5:
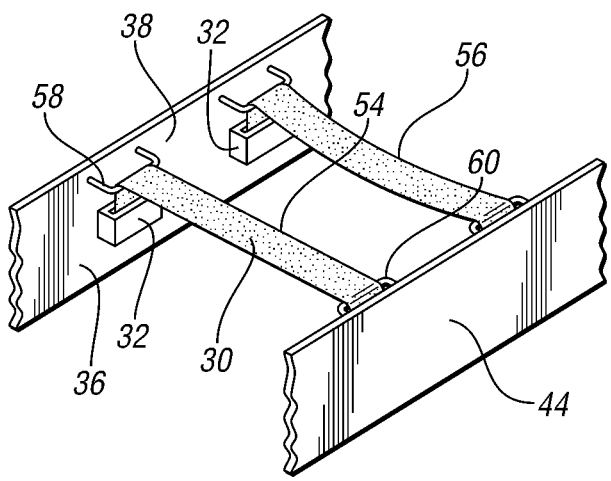
FIG. 5 is a partial view of a seat with a tensioning unit disposed on the inside of opposing frame members and a tensioning member routed through a bracket attached to a frame member.

FIG. 5 shows another embodiment in which a tensioning unit 32 is disposed on an inner surface 36 of a frame member 38. In this embodiment, a tension member 30 extends from the tensioning unit 32 upward and through a first guide bracket 58 across the seat to an opposing frame member 44 through a second guide bracket 60 and is anchored to the opposing frame member 44. Again a first tension member 54 is shown in an activated state where the tensioning unit 32 is maintaining or increasing the tension on the first tension member 54, and a second tension member 56 is shown in a relaxed state where a tensioning unit 32 is not maintaining or increasing tension on the second tension member 56.

Figure 6:
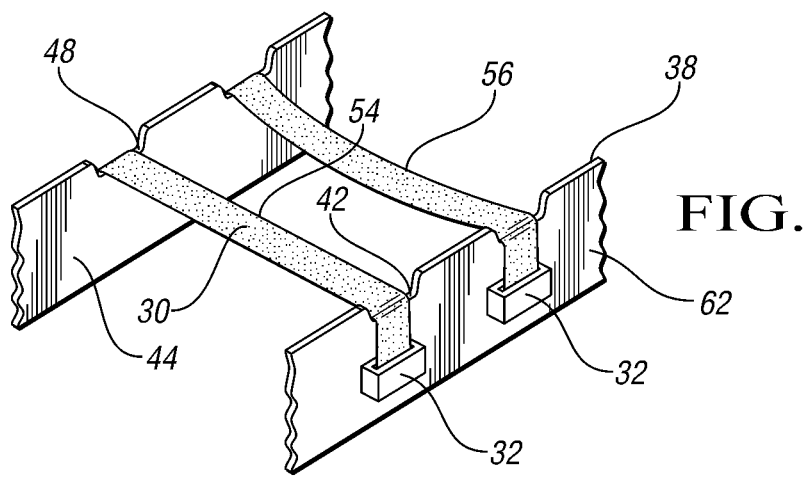
FIG. 6 is a partial view of a seat with a tensioning unit disposed on the outside of opposing frame members.

FIG. 6 shows yet another embodiment in which a tensioning unit 32 is disposed on an outer surface 62 of a frame member 38. In this embodiment the frame member 38 and an opposing frame member 44 both define a notch 42, 48 and the tension member extends from the tensioning unit 32 to the notches, spanning the opposing frame members 38, 44 between the two notches 42, 48 and is anchored to the opposing frame member 44. Again a first tension member 54 is shown in an activated state where the tensioning unit 32 is maintaining or increasing the tension on the first tension member 54, and a second tension member 56 is shown in a relaxed state where a tensioning unit 32 is not maintaining or increasing tension on the second tension member 56.

Figure 7:
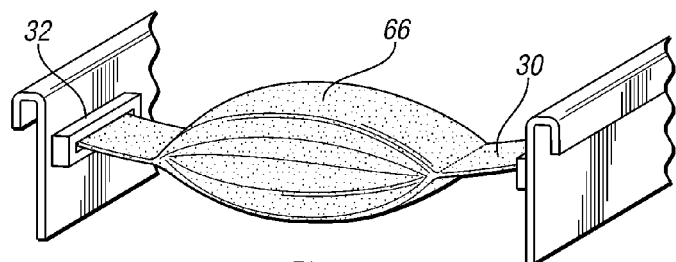
FIG. 7 is a partial view of a seat with an inflatable member connected to a tension member.

FIG. 7 shows an inflatable member 66 connected to a tension member 30. The inflatable member 66 may be a separate component attached to the tension member 30, or it may be integrated into the tension member 30. The inflatable member 66 may be deployable in response to a perceived vehicle dynamic event. The inflatable member 66 may be inflated using a pyro-technic device and an expandable material, similar to that of an air-bag, or may be pneumatic. The inflatable member 66 may be configured to expand and deflate per use, such that it is reusable, or may be a single use design. The inflatable member 66 may also be set at a second perceived vehicle dynamic event that is at a higher level of intensity than a first perceived vehicle dynamic event. An example may be that the tensioning unit 32 may lock the tension member 30 at a vehicle acceleration comparable with that of a hard braking event, whereas the inflatable member 66 may only deploy at a vehicle acceleration above that of a hard braking event, such as the vehicle impacting another object.

Figure 8:
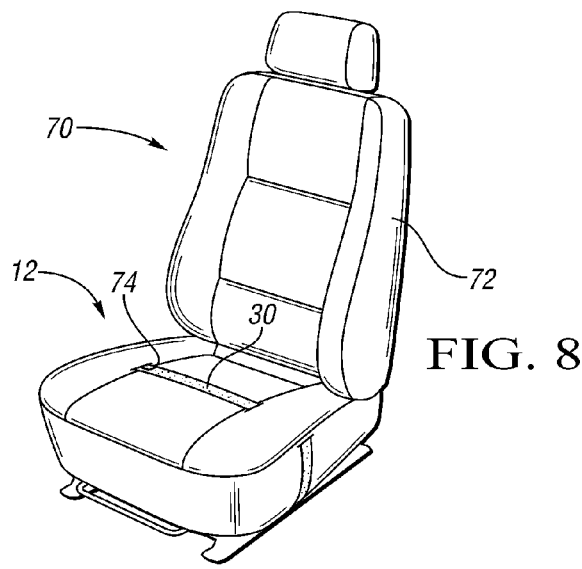
FIG. 8 is a perspective view of a vehicle seat having a tension member disposed outside of a seat base.

FIG. 8 shows a seat 70 complete with a frame 16 and seat suspension system 26 (best seen in FIG. 1) including foam cushioning and upholstery 72. In this embodiment the upholstery 72 covering the base 12 defines a number of passage holes 74, and the tension member 30 passes through the passage holes 74 and extends across the base 12 on the outside of the upholstery 72. The tension member 30 is still anchored to a frame member 38 within the base 12 on one end and extends to a tensioning unit 32 connected to an opposing frame member 44. The tensioning unit 32 may be disposed on the seat 70 such that it is disposed within the upholstery 72 and unseen by an occupant, as shown, or it may be connected to the seat 70 within view of the occupant. An aftermarket kit which provides for the attachment of a self-adjusting seat stiffness system to an existing seat may provide such a configuration.

Figure 9:
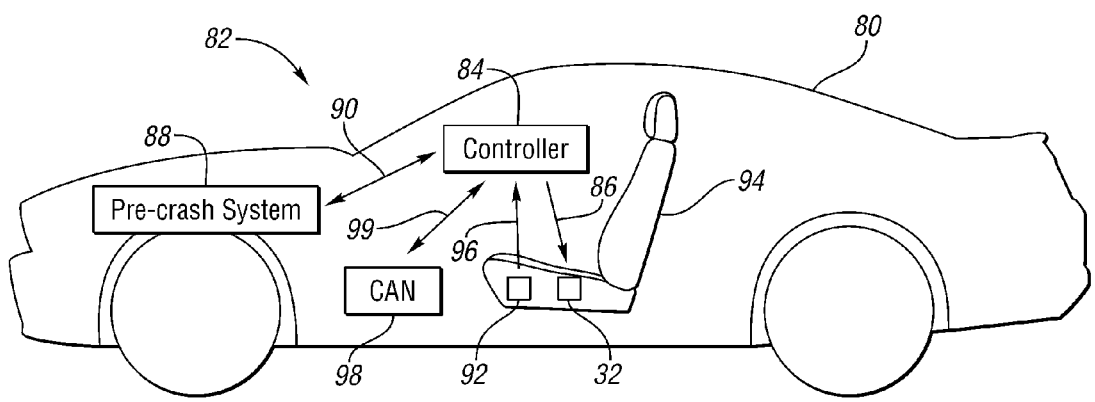
FIG. 9 is a diagrammatic view of a self-adjusting seat stiffness system.

FIG. 9 shows a vehicle 80 having a self-adjusting seat stiffness/vehicle seat anti-submarining system 82. The system 82 may have a controller 84 to control the tensioning unit 32. The controller 84 may send a signal 86 to the tensioning unit 32 to at least maintain an initial tension in the tension member 30 (see FIG. 1). The controller 84 may also send a signal 86 to the tensioning unit 32 to increase tension in the tension member 30.

The system 82 may also include, or be in communication with, a vehicle pre-crash system 88, as indicated by communication arrow 90. The controller 84 may communicate with the vehicle pre-crash system 88 to recognize a perceived vehicle dynamic event, and in response to the perceived vehicle dynamic event the controller 84 may send signal 86 to the tensioning unit 32 to maintain or increase tension on the tension member 30. The perceived vehicle dynamic event may be a potential collision of the vehicle 80 with another object as determined by the vehicle pre-crash system 88. The controller 84 may also set the tension of the tension member 30 at varying levels in response to the kind of potential collision of the vehicle 80 with another object.

The system 82 may further comprise, or be in communication with, a seat pressure sensor 92 disposed within the seat 94, as indicated by communication arrow 96. The controller 84 may communicate with the seat pressure sensor 92 to determine the amount of pressure an occupant (not shown) is placing on the seat when in the vehicle 80. During a vehicle dynamic event, the pressure of an occupant on the seat 94 may change, and the compression of the seat suspension system 26 (see FIG. 1) and cushions may increase the gap between the seat 94 and a seatbelt (not shown). The controller 84 may be preprogrammed with a seat pressure to seat compression comparison chart, and control the tensioning unit 32 to maintain a minimum seat compression. The minimum seat compression may also be scaled depending on the vehicle dynamics. In other words, a lower tension of the tension member 30 may be set at lower speeds and lower vehicle accelerations, while a higher tension of the tension member 30 may be set at higher vehicle speeds and for higher vehicle accelerations. With this embodiment, the perceived vehicle dynamic event is an increase in seat pressure, and the controller 84 may set the tension of the tension member 30 in response to an increase in seat pressure.

The system 82 may further comprise, or be in communication with, a vehicle communication system 98, as indicated by communication arrow 99. An internal vehicle communication system 98 may interconnect electronic systems within the vehicle 80. The vehicle communication system 98 may have certain protocols that are followed such as a Controller Area Network (CAN) or a Local Interconnect Network (LIN). Special requirements for vehicle control may be included in the vehicle communication system 98 such as assurance of message delivery, assured non-conflicting messages, assured time of delivery, EMF noise resilience, and illumination of redundant routing.

In this embodiment, which may be combined with the other embodiments, the controller 84 may be capable of accessing the vehicle communication system 98 and monitoring vehicle dynamics, such as acceleration or yaw, that are available from the vehicle communication system 98. The perceived vehicle dynamic event may be a trigger value of any of a number of monitorable vehicle dynamic parameters, including but not limited to an acceleration or yaw value. The controller 84 may set the tension of the tension member 30 in response to the trigger acceleration value.

The controller 84 may provide enhanced stiffness to a portion of the seat 94 in response to a perceived vehicle dynamic event. The enhanced stiffness may lower the gap between the seat 94 and a seatbelt that may increase due to compression of the seat 94 as caused by the weight of the occupant acting on the seat 94 during the event. The perceived vehicle dynamic event may be an actual rapid acceleration of the vehicle or a potential rapid acceleration of the vehicle.

The controller 84 may also be in communication with an inflatable member 66 (see FIG. 7) connected to the tension member 30. The controller 84 may also control the deployability of the inflatable member 66. As mentioned above, the inflatable member 66 may be deployed in unison with the tensioning of the tension member 30 or may be set to deploy at a higher level of perceived vehicle dynamics.

The tension member 30 in cooperation with the tensioning unit 32, and possibly in additional cooperation with a controller 84 of system 82, may be adapted to achieve combinations of the following goals: Provide enhanced restraint of an occupant during a dynamic vehicle event. Provide enhanced restraint of an occupant's pelvis. Provide a dynamic adjustable seat base cushion and back stiffness for use during performance vehicle dynamics. Prove a self-adaptive conforming seat cushion and back cushion for comfort at any time. Provide the occupant an adjustable seat base and back comfort level, whether manually or electronically, that is tunable for a particular design or by the occupant. Provide a pre-crash active restraining device. Provide a deployable inflatable member 66 option that may be inflated to increase in size, for the purposes of creating a reaction or obstruction surface to further enhance the restraint of an occupant during a dynamic vehicle event. Provide an occupant classification sensor which allows the controller 84 to further customize tensions depending on the occupant's weight. Occupant classification may also be used when deploying the inflatable member 66. An example being that a lighter weight occupant may be smaller and more susceptible to submarining, thus the target value for a lighter weight occupant may be lowered and the inflatable member deployed sooner for such a scenario. Provide a replacement for the traditional cushion pads and/or seating suspension systems 26 through use of dynamic support geometries and tensioning systems. Provide reactive and energy-absorbing restraint surface for rear impact (i.e., "seat back glove").

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A system comprising:
    a tension member spanning a portion of a seat base and connected to a tensioning unit operative to retract the tension member and increase tension therein when directed by a controller in response to a perceived vehicle dynamic event, the tension member urging a seat suspension system upward when the tension increases.

2. The system of claim 1 wherein the tensioning unit is an inertial-latching retracting spool.

3. The system of claim 1 wherein the tensioning unit is an electric retractor.

4. The system of claim 1 wherein the tensioning unit is a pyro-technic retractor.

5. The system of claim 1 further comprising a vehicle pre-crash system, wherein the controller is in communication with the vehicle pre-crash system, the perceived vehicle dynamic event is a potential collision with another object as determined by the vehicle pre-crash system, and the controller sets the tension of the tension member in response to the potential collision of a vehicle hosting the system with another object.

6. The system of claim 1 further comprising a seat pressure sensor, wherein the controller is in communication with the seat pressure sensor, the perceived vehicle dynamic event is an increase in seat pressure, and the controller sets the tension of the tension member in response to an increase in seat pressure.

7. The system of claim 1 further comprising a vehicle communication system, wherein the controller is in communication with the vehicle communication system and capable of monitoring vehicle acceleration, the perceived vehicle dynamic event is a trigger acceleration value, and the controller sets the tension of the tension member in response to the trigger acceleration value.

8. The system of claim 1 wherein the seat base has opposing first and second frame members and the tension member spans the seat base between the first and second frame members.

9. The system of claim 8 wherein the tension member is connected to the first frame member and the tensioning unit is connected to the second frame member.

10. The system of claim 1 wherein the tension member is aligned transversely with respect to a vehicle hosting the system.

11. The system of claim 1 further comprising an inflatable member connected to the tension member, wherein the inflatable member is deployable in response to a signal from the controller.

12. A system comprising:
a tension member spanning between opposing frame members of a seat base;
a tensioning unit operative to retract the tension member to increase tension therein;
a controller directing the tensioning unit to retract the tension member to provide enhanced stiffness to a portion of the seat base in response to a perceived vehicle dynamic event; and
an inflatable member connected to the tension member and deployable in response to the increased tension of the tension member.

13. The system of claim 12 wherein the perceived vehicle dynamic event is an acceleration of a vehicle hosting the system above a target acceleration.

14. The system of claim 12 wherein the perceived vehicle dynamic event is a potential collision of a vehicle hosting the system with another object.

15. The system of claim 12 wherein the tensioning unit is at least one of an inertial-latching retracting spool, an electric retractor, and a pyro-technic retractor.

16. A system for a vehicle comprising:
a seat having a base and a suspension system;
a tension member spanning a portion of the base;
a tensioning unit connected to the tension member and operative to retract the tension member and increase tension therein; and
a controller directing the tensioning unit to retract the tension member in response to a perceived vehicle dynamic event, the tension member urging the suspension system upward when the tension increases.

17. The system of claim 16 wherein the suspension system comprises a spring-style seat suspension system.

18. The system of claim 16 wherein the tension member is interwoven with the suspension system.

19. The system of claim 16 wherein the base has opposing first and second frame members and the tension member spans the base between the first and second frame members.

20. The system of claim 19 wherein the tension member is connected to the first frame member and the tensioning unit is connected to the second frame member.

\* \* \* \* \*